US012785424B2

(12) United States Patent
Starman et al.

(10) Patent No.: US 12,785,424 B2
(45) Date of Patent: Nov. 3, 2026

(54) VIRTUAL TEMPERATURE SENSOR

(71) Applicant: Google LLC, Mountain View, CA (US)

(72) Inventors: Jared Starman, Mountain View, CA (US); Mike Mehlman, Mountain View, CA (US); TeYuan Wang, New Taipei City (TW); Paul B. Crosbie, Chicago, IL (US)

(73) Assignee: Google LLC, Mountain View, CA (US)

( * ) Notice: Subject to any disclaimer, the term of this patent is extended or adjusted under 35 U.S.C. 154(b) by 896 days.

(21) Appl. No.: 18/044,058

(22) PCT Filed: Jun. 7, 2021

(86) PCT No.: PCT/US2021/036172
§ 371 (c)(1),
(2) Date: Mar. 3, 2023

(87) PCT Pub. No.: WO2022/072009
PCT Pub. Date: Apr. 7, 2022

(65) Prior Publication Data

US 2023/0318323 A1 Oct. 5, 2023

Related U.S. Application Data

(60) Provisional application No. 63/084,797, filed on Sep. 29, 2020.

(51) Int. Cl.
*H02J 7/65* (2026.01)
*G01K 3/14* (2006.01)
(Continued)

(52) U.S. Cl.
CPC .................. *H02J 7/65* (2026.01); *G01K 3/14* (2013.01); *G06F 1/266* (2013.01); *H02J 7/975* (2026.01); *G01K 2003/145* (2013.01)

(58) Field of Classification Search
CPC .......................................................... H02J 7/65
(Continued)

(56) References Cited

U.S. PATENT DOCUMENTS 12,043,140 B2 * 7/2024 Titus ....................... B60L 50/64
2009/0195237 A1 * 8/2009 Feliss ........................ B60L 3/04
323/318
(Continued)

FOREIGN PATENT DOCUMENTS

EP 3160004 A1 4/2017
WO 2019141629 A1 7/2019

OTHER PUBLICATIONS

First Examination Report from counterpart Indian Application No. 202347029529 dated Feb. 27, 2025, 6 pp.
(Continued)

*Primary Examiner* — Ahmed H Omar
(74) *Attorney, Agent, or Firm* — Shumaker & Sieffert, P.A.

(57) ABSTRACT

An example method includes receiving electrical power via a physical connector of a mobile computing device; determining, by a controller of the mobile computing device, a value of a temperature of a virtual temperature sensor, the value representing a difference between a temperature measured by a first temperature sensor of a plurality of temperature sensors of the mobile computing device and a temperature measured by a second temperature sensor of the plurality of temperature sensors, wherein a distance between the first temperature sensor and the physical connector is less than a distance between the second temperature sensor and the physical connector; determining, based on the value of the temperature of the virtual temperature sensor, whether an overheat event has occurred; and responsive to determin-
(Continued)

ing that the overheat event has occurred, reducing an amount of electrical current flowing through the physical connector.

17 Claims, 3 Drawing Sheets

(51) Int. Cl.
*G06F 1/26* (2006.01)
*H02J 7/90* (2026.01)

(58) Field of Classification Search
USPC .......................................................... 320/150
See application file for complete search history.

(56) References Cited

U.S. PATENT DOCUMENTS

| | | | | |
|---|---|---|---|---|
| 2011/0050175 | A1* | 3/2011 | Odaohhara | H01M 10/443 320/136 |
| 2015/0048804 | A1 | 2/2015 | Toivanen et al. | |
| 2016/0131541 | A1 | 5/2016 | Kim et al. | |
| 2017/0141608 | A1* | 5/2017 | Stenger | H02J 7/0045 |
| 2017/0207647 | A1* | 7/2017 | Zhang | G01K 1/14 |
| 2017/0334300 | A1 | 11/2017 | Huang et al. | |
| 2019/0375309 | A1* | 12/2019 | Fuhrer | B60L 53/302 |

OTHER PUBLICATIONS

Notice of Intent to Grant from counterpart Indian Application No. 202347029529 dated May 22, 2025, 2 pp.
Response to Office Action dated Feb. 27, 2025, from counterpart Indian Application No. 202347029529 filed Apr. 30, 2025, 12 pp.
Response to Communication Pursuant to Rules 161(1) and 162 EPC dated Mar. 24, 2023, from counterpart European Application No. 21736459.5, filed Sep. 15, 2023, 15 pp.
Notice of Intent to Grant and Text Intended to Grant from counterpart European Application No. 21736459.5 dated Jan. 4, 2024, 30 pp.
International Search Report and Written Opinion of International Application No. PCT/US2021/036172 dated Sep. 15, 2021, 13 pp.
Phillips, "Implementing a better design approach to fault detection in USB-C cables", Nov. 13, 2018, 4 PP.

* cited by examiner

VIRTUAL TEMPERATURE SENSOR

This application is a 371 application of International Application No. PCT/US2021/036172, filed 7 Jun. 2021 which claims the benefit of U.S. Provisional Patent Application No. 63/084,797, filed 29 Sep. 2020, the entire contents of which is incorporated herein by reference.

BACKGROUND

A mobile computing device, such as a mobile phone, may include a power storage device, such as a battery. The computing device may also include a connector via-which power is received from an external power supply to charge the power storage device. Due to a variety of causes, short circuits may occur in the connector and such short circuits may result in undesirable heating.

SUMMARY

A mobile computing device may be configured to automatically cease charging based on a temperature of a connector via-which power is received from an external power supply. For instance, the mobile computing device may include a temperature sensor proximate to the connector. Responsive to a temperature measured by the temperature sensor being greater than a threshold temperature, the mobile computing device may determine that an overheat event has occurred and reduce, in some examples to zero, an amount of current flowing through the connector. In this way, the mobile computing device may mitigate overheating issues resulting from short circuits in the connector. However, in some examples, the temperature measured by the temperature sensor may not be an accurate representation of a temperature of the connector. As one example, one or more other components of the mobile computing device may, in normal operation, generate heat proximate to the connector that increases the temperature measured by the temperature sensor, falsely indicating the occurrence of an overheat event. As another example, a circuit board on-which the connector and the temperature sensor are mounted may absorb some heat generated in the connecter during an actual short circuit event, which may result in a delay before detection of an actual overheat event or even a failure to detect an overheat event.

In accordance with one or more techniques of this disclosure, a mobile computing device may utilize a virtual sensor to determine if an overheat event has occurred. For instance, the mobile computing device may include a plurality of temperature sensors at different locations. The mobile computing device may determine whether an overheat event has occurred based on temperatures measured by at least two temperature sensors of the plurality of temperature sensors. For instance, where the plurality of temperature sensors includes a first temperature sensor proximate to the connector and a second temperature sensor distal to the connector, the mobile computing device may detect an occurrence of an overheat event in the connector based on a difference between a temperature measured by the first temperature sensor and a temperature measured by the second temperature sensor. By using measurements from differently located temperature sensors, the mobile computing device may improve the accuracy of overheat event occurrence. As one example, using the temperature measured by the second temperature sensor may reduce the likelihood that a false positive detection will occur as a result of heat generated by other components (e.g., as such heat would raise the measurements generated by both sensors). As another example, using the temperature measured by the second temperature sensor may reduce the likelihood that a false negative detection will occur as a result of heat being absorbed by the circuit board (e.g., as there would still be a heat gradient between the two sensors).

In one example, a mobile computing device includes a physical connector configured to receive a charging cable; a plurality of temperature sensors; and a controller configured to: detect, based on a difference between a temperature measured by a first temperature sensor of the plurality of temperature sensors and a temperature measured by a second temperature sensor of the plurality of temperature sensors, an occurrence of an overheat event in the physical connector, wherein a distance between the first temperature sensor and the physical connector is less than a distance between the second temperature sensor and the physical connector; and responsive to detecting the occurrence of the overheat event, reducing an amount of electrical current flowing through the physical connector.

In another example, a method includes receiving electrical power via a physical connector of a mobile computing device; determining, by a controller of the mobile computing device, a value of a temperature of a virtual temperature sensor, the value representing a difference between a temperature measured by a first temperature sensor of a plurality of temperature sensors of the mobile computing device and a temperature measured by a second temperature sensor of the plurality of temperature sensors, wherein a distance between the first temperature sensor and the physical connector is less than a distance between the second temperature sensor and the physical connector; determining, based on the value of the temperature of the virtual temperature sensor, whether an overheat event has occurred; and responsive to determining that the overheat event has occurred, reducing an amount of electrical current flowing through the physical connector.

In another example, a computer-readable storage medium stores instructions that, when executed, cause a mobile computing device to receive electrical power via a physical connector of a mobile computing device; determine a value of a temperature of a virtual temperature sensor, the value representing a difference between a temperature measured by a first temperature sensor of a plurality of temperature sensors of the mobile computing device and a temperature measured by a second temperature sensor of the plurality of temperature sensors, wherein a distance between the first temperature sensor and the physical connector is less than a distance between the second temperature sensor and the physical connector; determine, based on the value of the temperature of the virtual temperature sensor, whether an overheat event has occurred; and reduce, responsive to determining that the overheat event has occurred, an amount of electrical current flowing through the physical connector.

Additional features, advantages, and embodiments of the disclosed subject matter may be set forth or apparent from consideration of the following detailed description, drawings, and claims. Moreover, it is to be understood both the foregoing summary and the following detailed description are illustrative and are intended to provide further explanation without limiting the scope of the claims.

DETAILED DESCRIPTION

Figure 1:
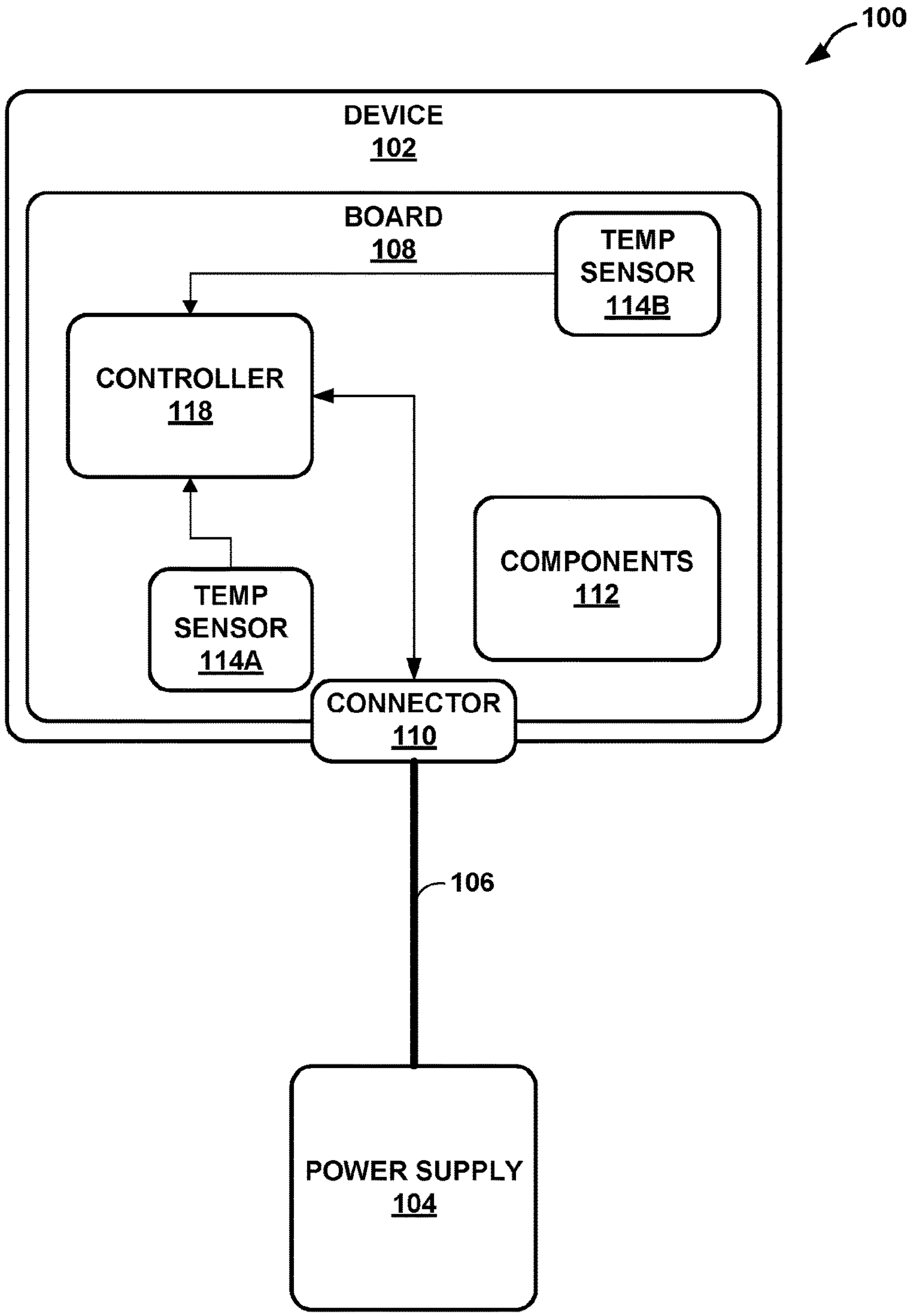
FIG. 1 is a block diagram illustrating a representation of a system that includes a mobile computing device and a power supply, in accordance with one or more aspects of this disclosure.

FIG. 1 is a block diagram illustrating a representation of a system that includes a mobile computing device and a power supply, in accordance with various aspects of this disclosure. As shown in FIG. 1, system 100 may include mobile computing device 102, power supply 104, and cable 106.

Power supply 104 may represent any external device (e.g., external from mobile computing device 102) that is capable of providing electrical power to mobile computing device 102. Examples of power supply 104 include, but are not limited to, mains adapters (e.g., wall adapters such as AC/DC adapters), portable power banks, other mobile computing devices (e.g., smartphones, laptops, tablets, etc.), and the like. Power supply 104 may provide electrical power to mobile computing device 102 via a wired connection over cable 106. In some examples, cable 106 may be permanently attached to power supply 104. In other examples, cable 106 may be connected to power supply 104 via a connector, which may or may not be the same connector type as connector 110 of mobile computing device 102 as discussed below.

Cable 106 may be any cable capable of transporting electrical power from power supply 104 to mobile computing device 102. Examples of cable 106 include, but are not limited to, universal serial bus (USB) cables, Thunderbolt cables, Lightning cables, and/or the like.

Mobile computing device 102 may be any device capable of operating using power received from an external power supply, such as power supply 104. Examples of mobile computing device 102 may include, but are not limited to, a mobile phone (including a so-called "smartphone"), smart glasses, a smart watch, a portable speaker (including a portable smart speaker), a laptop computer, a portable gaming system, a wireless gaming system controller, a wireless headphone charging case, and the like. As shown in FIG. 1, mobile computing device 102 may include, circuit board 108, connector 110, components 112, temperature sensors 114A and 114B (collectively, "temperature sensors 114"), and controller 118.

Circuit board 108 may be any type of circuit board to-which other components may be attached. Circuit board 108 may be a printed circuit board and may have multiple layers with embedded traces electrically connecting components. In some examples, circuit board 108 may be referred to as a main logic board (MLB) to-which primary components of mobile computing device 102 may be attached (e.g., a system on a chip (SoC), an application processor, memory, storage, etc.). In the example of FIG. 1, at least connector 110, temperature sensor 114A and temperature sensor 114B may be attached to board 108. However, in some examples, components 112 and/or controller 118 may also be attached to board 108.

Connector 110 may be a physical connector configured to receive a connector of cable 106. Examples of connector 110 include, but are not limited to, universal serial bus (USB) connectors, Thunderbolt connectors, Lightning connectors, or any connector via-which electrical power may be received over a wired connection. In one specific example, connector 110 may be a USB type-C connector (e.g., a receptacle).

Components 112 may represent any components of mobile computing device 102 that generate heat during operation. Examples of components 112 include, but are not limited to, processors (e.g., application processors), power management components (e.g., power management integrated circuits, wireless charging components, wired charging components), batteries (e.g., when charging), displays, display controllers, camera components (e.g., camera flash light emitting diodes (LEDs)), wireless radios (e.g., 4G radios, 5G radios, Wi-Fi radios, Bluetooth radios, RF power amplifiers, etc.), speakers, areas of high current flow, and the like.

Temperature sensors 114 may represent any components that measure temperature. Examples of temperature sensors 114 include, but are not limited to, thermistors, thermocouples, and any other components that generate a signal as a function of temperature. Sensors of temperature sensors 114 may be positioned at various locations of mobile computing device 102. For instance, as shown in the example of FIG. 1, temperature sensors 114A and 114B may both be attached to board 108, with temperature sensor 114A more proximal to connector 110 than temperature sensor 114B. In some examples, one or more of temperature sensors 114 may be standalone temperature sensors (e.g., discrete components). In some examples, one or more of temperature sensors 114 may be integrated into other components. For instance, a temperature sensor of temperature sensors 114 may be integrated into a component of components 112.

Controller 118 may be configured to control operations of various functions of mobile computing device 102. For instance, controller 118 may be configured to communicate with power supply 104 (e.g., via cable 106) to negotiate one or more parameters of a power signal provided by power supply 104. For example, controller 118 may communicate with power supply 104 in accordance with the USB power delivery (USB-PD) standard published by the USB Implementers Forum, Inc (available at usb.org/document-library/usb-power-delivery). Examples of controller 118 include, but are not limited to, one or more digital signal processors (DSPs), general purpose microprocessors, application specific integrated circuits (ASICs), field programmable logic arrays (FPGAs), or other equivalent integrated or discrete logic circuitry In operation, controller 118 may monitor various aspects of mobile computing device 102. For instance, controller 118 may monitor for occurrence of an overheat event in connector 110. Responsive to detecting the occurrence of the overheat event in connector 110, controller 118 may reduce an amount of electrical current flowing through connector 110. For instance, controller 118 may output, via cable 106, a signal to power supply 104 requesting that power supply 104 reduce an amount of power provided to mobile computing device 102. As the overheat event is most likely the result of current flowing through a short circuit in connector 110, reducing the amount of current flowing through connector 110 may reduce the amount of heat generated by current flowing through the short circuit, thereby mitigating heat-induced damage.

As temperature sensor 114A is proximal to connector 110, the temperature sensed by temperature sensor 114A may closely represent the actual temperature of connector 110. Therefore, in some examples, controller 118 may detect an occurrence of an overheat event solely based on the temperature measured by temperature sensor 114A. For instance, controller 118 may determine that an overheat event has occurred responsive to the temperature sensed by temperature sensor 114A being greater than a threshold temperature.

However, in some examples, it may not be desirable to detect occurrences of overheat events solely based on the temperature measured by temperature sensor 114A. As one example, one or more of components 112 may, in normal operation, generate heat proximate to connector 110 that increases the temperature measured by temperature sensor 114A. Such heat generation may cause controller 118 to falsely detect the occurrence of an overheat event. As another example, board 108 (e.g., on-which connector 110 and temperature sensor 114A may be mounted) may absorb some heat generated in connecter 110 during an actual short circuit event, which may result in a delay before controller 118 may detect of an actual overheat event or even a failure of controller 118 to detect an overheat event.

In accordance with one or more aspects of this disclosure, controller 118 may detect occurrence of an overheat event using a virtual sensor that is generated using temperatures sensed by at least two of temperature sensors 114. For instance, controller 118 may generate a temperature value of the virtual sensor as a difference between temperatures sensed by temperature sensor 114A and temperature sensor 114B. If the difference value is greater than a threshold temperature (example threshold temperatures include, but are not limited to, 4, 5, 6, 7, 8, 9, or 10 degrees Celsius), controller 118 may detect occurrence of an overheat event in connector 110. As discussed above, responsive to detecting the occurrence of the overheat event, controller 118 may reduce an amount of electrical current flowing through connector 110.

By using a virtual temperature sensor generated based on measurements from differently located temperature sensors, controller 118 may improve the accuracy of overheat event occurrence. As one example, using the temperature measured by temperature sensor 114B may reduce the likelihood that a false positive detection will occur as a result of heat generated by components 112 (e.g., as such heat would raise the measurements generated by both sensors 114A and 114B, thus not raising the differential temperature). As another example, using the temperature measured by temperature sensor 114B may reduce the likelihood that a false negative detection will occur as a result of heat being absorbed by board 108 (e.g., as there would still be a heat gradient between temperature sensor 114A and temperature sensor 114B which would cause the differential temperature to exceed the threshold temperature when significant heat is generated in connector 110).

While described above as detecting occurrence of the overheat event based on a value of a virtual sensor determined as a difference between temperatures measured by two sensors, the techniques of this disclosure are not so limited. For instance, in some examples, controller 118 may the value of the virtual sensor may be a difference between a temperature measured by a first temperature sensor and a function of temperatures measured by a set of temperature sensors, which may include two or more temperature sensors. As one example, controller 118 may determine the value of the virtual sensor as a difference between a temperature measured by temperature sensor 114A and a function of a temperature measured by temperature sensor 114B and a temperature measured by another temperature sensor. In some examples, the function may be an average of the temperatures measured by the set of temperature sensors. By determining the value of the virtual sensor using a function of the set of temperature sensors, controller 118 may reduce false positives (e.g., false positive detections of overheat events) that may be cause from heat generated by multiple internal sources (e.g., where multiple members of components 112 are generating heat).

As one example, where the average is an evenly weighted average, controller 118 may determine the value of the virtual sensor in accordance with the following equation:

$$T_{Virtual} = T_{FirstSensor} - \frac{1}{N}\sum_{i=1}^{N} T_{Sensori}$$

where $T_{Virtual}$ is the value of the virtual sensor, $T_{FirstSensor}$ is the temperature measured by the first temperature sensor (e.g., temperature sensor 114A), N is the quantity of temperature sensors included in the set of temperature sensors, and $T_{Sensori}$ is the temperature measured by the ith sensor of the set of temperature sensors.

As another example, where the average is an unevenly weighted average, controller 118 may determine the value of the virtual sensor in accordance with the following equation:

$$T_{Virtual} = T_{FirstSensor} - \frac{1}{N}\sum_{i=1}^{N} T_{Sensori} w_i$$

where $T_{Virtual}$ is the value of the virtual sensor, $T_{FirstSensor}$ is the temperature measured by the first temperature sensor (e.g., temperature sensor 114A), N is the quantity of temperature sensors included in the set of temperature sensors, $T_{Sensori}$ is the temperature measured by the ith sensor of the set of temperature sensors, and $w_i$ is the weight for the ith sensor of the set of temperature sensors. In some examples, the weights (e.g., values of $w_i$) may be based on distances between temperature sensors of the two or more temperature sensors and the physical connector.

Figure 2:
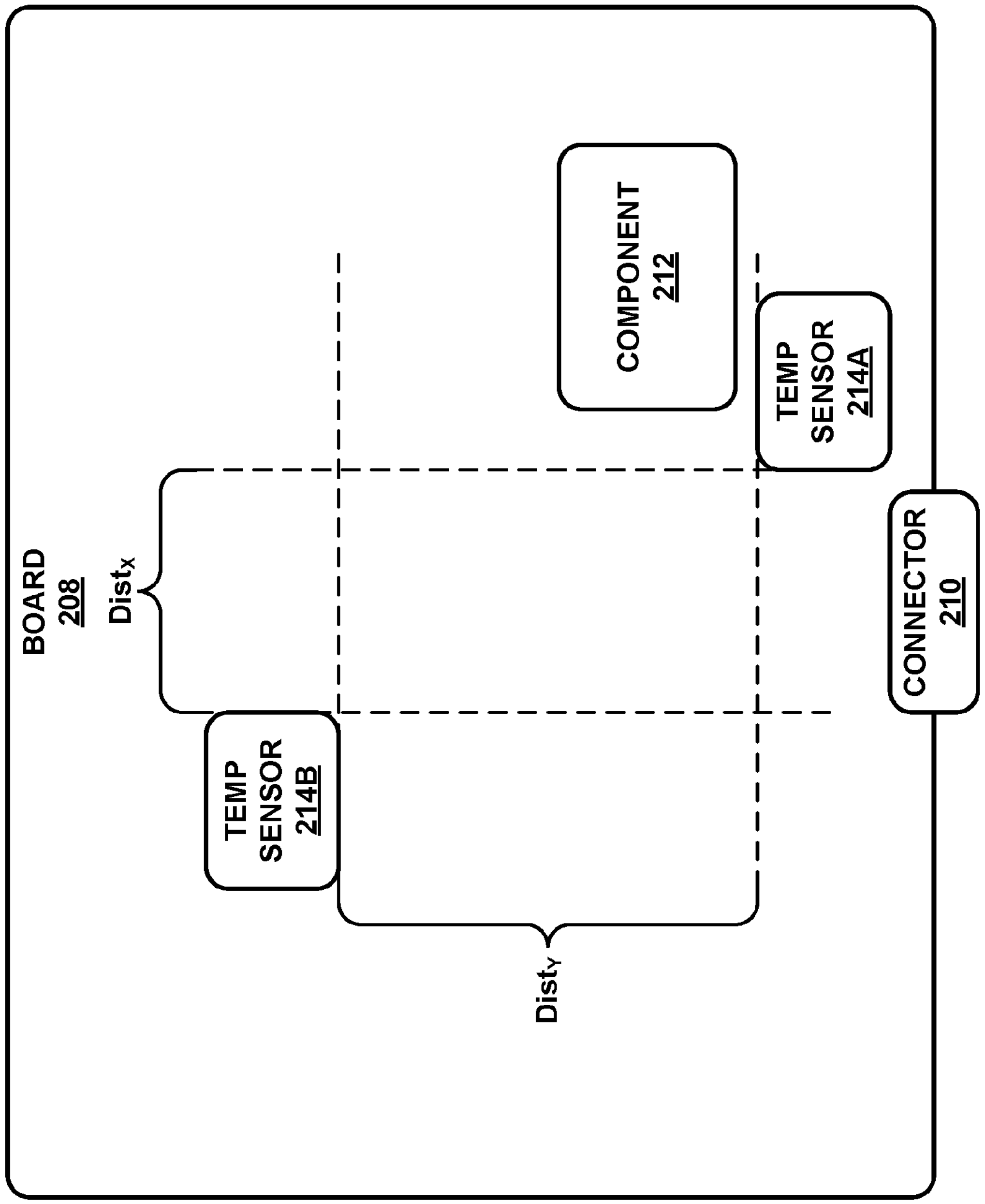
FIG. 2 is a block diagram illustrating further details of one example of a circuit board of a mobile computing device, in accordance with one or more aspects of this disclosure.

FIG. 2 is a block diagram illustrating further details of one example of a circuit board of a mobile computing device, in accordance with one or more aspects of this disclosure. Board 208 of FIG. 2 may be considered an example of board 108 of FIG. 1. Similarly, connector 210 and temperature sensors 214A and 214B (collectively, "temperature sensors 214") may be considered examples of connector 110 and temperature sensors 114A and 114B of FIG. 1. Component 212 may be considered to be an example of a component of components 112 of FIG. 1.

As shown in FIG. 2, component 212 is closer to connector 210 than temperature sensor 214B is to connector 210. In particular, a distance between component 212 and connector may be less than a distance between temperature sensor 214B and connector 210. As shown in FIG. 2, temperature sensor 214 is closer to connector 210 than component 212 is to connector 210. For instance, a distance between component 212 and connector 210 may be greater than a distance between temperature sensor 214A and connector 210. However, in other examples, component 212 may be located closer to connector 210 than temperature sensor 214A is to connector 210. For instance, a distance between component 212 and connector 210 may be less than a distance between temperature sensor 214A and connector 210.

As shown in FIG. 2, temperature sensors 214 may be distributed such that a distance between temperature sensor 214A and connector 210 is less than a distance between temperature sensor 214B and connector 210. As such, temperature sensor 214A may be considered to be closer to connector 210 than temperature sensor 214B is to connector 210. Temperature sensor 214A may be horizontally displaced from temperature sensor 214B by $Dist_x$ and/or vertically displaced from temperature sensor 214B by $Dist_y$. In some examples, $Dist_x$ may be greater than 10 mm, such as 19 mm. In some examples $Dist_y$ may be greater than 20 mm, such as 35 mm. As such, in some examples, temperature sensor 214A may be at least 3 centimeters from temperature sensor 214B. As discussed above, spacing temperature sensor 214A away from temperature sensor 214B may provide various advantages, such as increased sensitivity to overheat events in connector 210.

Figure 3:
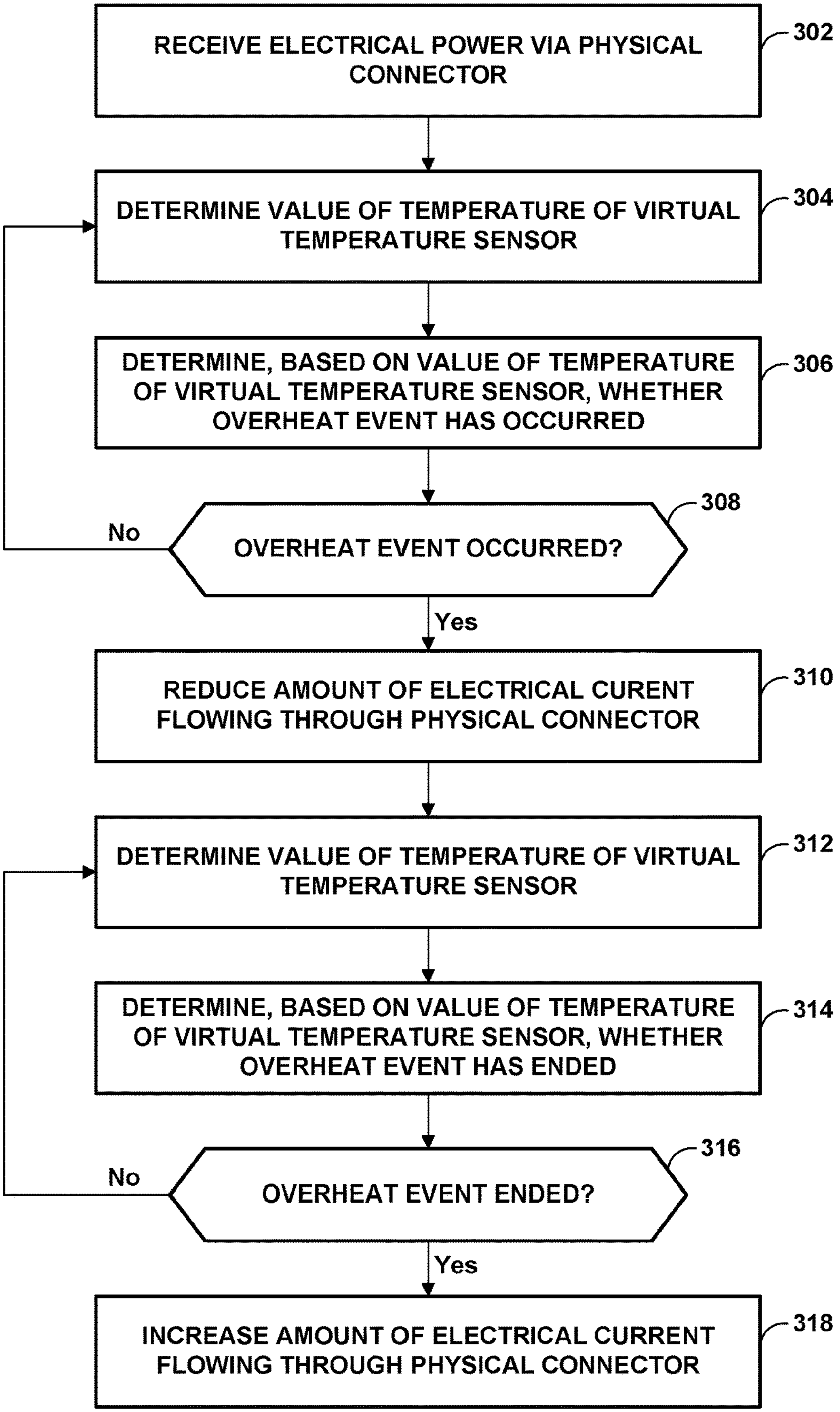
FIG. 3 is a flow diagram illustrating example operations of a mobile device that detects overheat events using a virtual sensor, in accordance with one or more techniques of this disclosure.

FIG. 3 is a flow diagram illustrating example operations of a mobile device that detects overheat events using a virtual sensor, in accordance with one or more techniques of this disclosure. Although described with reference to mobile computing device of FIG. 1, the operations of FIG. 3 may be performed by components of any suitable mobile computing device.

Mobile computing device 102 may receive electrical power via a physical connector (302). For instance, mobile computing device 102 may receive electrical power from power supply 104 of FIG. 1 via cable 106 connected to connector 110.

Mobile computing device 102 may determine a value of a temperature of a virtual temperature sensor (304). For instance, controller 118 may determine a difference between a temperature measured by a first temperature sensor, such as temperature sensor 114A, and a temperature measured by a second temperature sensor, such as temperature sensor 114B. As discussed above, a distance between temperature sensor 114A and physical connector 110 is less than a distance between temperature sensor 114B and physical connector 110.

Mobile computing device 102 may determine, based on the value of the temperature of the virtual temperature sensor, whether an overheat event has occurred (306). For instance, controller 118 may determine that the overheat event has occurred responsive to determining that the difference between the temperature measured by the first temperature sensor and the temperature measured by the second temperature sensor being greater than a threshold temperature. In other words, controller 118 may determine that the overheat event has occurred responsive to determining that the temperature differential between temperature sensor 114A and temperature sensor 114B is greater than the threshold temperature.

Where the overheat event has not occurred ("No" branch of 308), mobile computing device 102 may continue to monitor the value of the temperature of the virtual temperature sensor (304). Responsive to determining that the overheat event has occurred ("Yes" branch of 308), mobile computing device may reduce an amount of electrical current flowing through the physical connector (310). For instance, controller 118 may output, via cable 106, a signal to power supply 104 requesting that power supply 104 reduce an amount of power provided to the mobile computing device. As one example, controller 118 may output, via cable 106, a signal to power supply 104 requesting that power supply 104 cease providing power to mobile computing device 102. By reducing the amount of current flowing through the connector, mobile computing device 102 may stop the overheating event from continuing.

In some examples, mobile computing device 102 may attempt to resume receiving power when the overheat event has passed. For instance, after reducing the amount of current flowing through the physical connector, mobile computing device 102 may determine an updated value of the temperature of the virtual temperature sensor (312) in a manner similar to (304). Mobile computing device 102 may determine, based on the updated value of the temperature of the virtual temperature sensor, whether the overheat event has ended (314). For instance, controller 118 may detect an end of the overheat event responsive to the difference between the temperature measured by the first temperature sensor and the temperature measured by the second temperature sensor being less than a threshold temperature. In some examples, the threshold temperature used by mobile computing device 102 to determine whether an overheat event has ended may be the same as the threshold temperature used to determine whether the overheat event has occurred. In other examples, the threshold temperature used by mobile computing device 102 to determine whether an overheat event has ended may be different than (e.g., lower than) the threshold temperature used to determine whether the overheat event has occurred. As such, mobile computing device 102 may implement a hysteresis. By using a hysteresis, mobile computing device 102 may avoid frequent adjustments to the amount of power received.

Where the overheat event has not ended ("No" branch of 316), mobile computing device 102 may continue to monitor the value of the temperature of the virtual temperature sensor (312). Responsive to determining that the overheat event has ended ("Yes" branch of 316), mobile computing device may increase an amount of electrical current flowing through the physical connector (318). For instance, controller 118 may output, via cable 106, a signal to power supply 104 requesting that power supply 104 increase an amount of power provided to mobile computing device 102. As one example, controller 118 may output, via cable 106, a signal to power supply 104 requesting that power supply 104 resume providing power to mobile computing device 102.

The following numbered examples may illustrate one or more aspects of the disclosure:

Example 1

A mobile computing device comprising: a power storage device; a physical connector configured to receive a charging cable; a plurality of temperature sensors; and a controller configured to: detect, based on a difference between a temperature measured by a first temperature sensor of the plurality of temperature sensors and a temperature measured by a second temperature sensor of the plurality of temperature sensors, an occurrence of an overheat event in the physical connector, wherein a distance between the first temperature sensor and the physical connector is less than a distance between the second temperature sensor and the physical connector; and responsive to detecting the occurrence of the overheat event, reducing an amount of electrical current flowing through the physical connector.

Example 2

The mobile computing device of example 1, wherein, to detect the occurrence of the overheat event, the controller is configured to detect the occurrence of the overheat event responsive to the difference between the temperature measured by the first temperature sensor and the temperature measured by the second temperature sensor being greater than a threshold temperature.

Example 3

The mobile computing device of example 1 or example 2, further comprising: a circuit board, wherein the plurality of temperature sensors and the physical connector are attached to the circuit board.

Example 4

The mobile computing device of any of examples 1-3, further comprising: one or more components attached to the circuit board that generate heat during operation.

Example 5

The mobile computing device of example 4, wherein a distance between at least one of the one or more components and the connector is less than the distance between the second temperature sensor and the physical connector.

Example 6

The mobile computing device of any of examples 1-5, wherein, to reduce the amount of electrical current flowing through the physical connector, the controller is configured to: output, via the charging cable, a signal to a power supply requesting that the power supply reduce an amount of power provided to the mobile computing device.

Example 7

The mobile computing device of example 6, wherein, to output the signal, the controller is configured to: output, via the charging cable, a signal to the power supply requesting that the power supply cease providing power to the mobile computing device.

Example 8

The mobile computing device of any of examples 2-7, wherein the threshold temperature is a first threshold temperature, and wherein the controller is further configured to: detect an end of the overheat event responsive to the difference between the temperature measured by the first temperature sensor and the temperature measured by the second temperature sensor being less than a second threshold temperature, the second threshold temperature being lower than the first threshold temperature; and responsive to detecting the end of the overheat event, output, via the charging cable, a signal to the power supply requesting that the power supply resume providing power to the mobile computing device.

Example 9

The mobile computing device of any of examples 1-8, wherein the physical connector is a universal serial bus type-C connector.

Example 10

A method comprising: receiving electrical power via a physical connector of a mobile computing device; determining, by a controller of the mobile computing device, a value of a temperature of a virtual temperature sensor, the value representing a difference between a temperature measured by a first temperature sensor of a plurality of temperature sensors of the mobile computing device and a temperature measured by a second temperature sensor of the plurality of temperature sensors, wherein a distance between the first temperature sensor and the physical connector is less than a distance between the second temperature sensor and the physical connector; determining, based on the value of the temperature of the virtual temperature sensor, whether an overheat event has occurred; and responsive to determining that the overheat event has occurred, reducing an amount of electrical current flowing through the physical connector.

Example 11

The method of example 10, wherein determining whether the overheat event has occurred comprises determining that the overheat event has occurred responsive to determining that the difference between the temperature measured by the first temperature sensor and the temperature measured by the second temperature sensor being greater than a threshold temperature.

Example 12

The method of example 10 or example 11, wherein the plurality of temperature sensors and the physical connector are attached to a circuit board.

Example 13

The method of any of examples 10-12, further comprising: generating, by one or more components of the mobile computing device, heat, wherein a distance between at least one of the one or more components and the connector is less than the distance between the second temperature sensor and the physical connector.

Example 14

The method of any of examples 10-13, wherein reducing the amount of electrical current flowing through the physical connector comprises: outputting, by the mobile computing device and via a charging cable, a signal to a power supply requesting that the power supply reduce an amount of power provided to the mobile computing device.

Example 15

The method of example 14, wherein outputting the signal comprises: outputting, by the mobile computing device and via the charging cable, a signal to the power supply requesting that the power supply cease providing power to the mobile computing device.

Example 16

The method of example 15, wherein the threshold temperature is a first threshold temperature, and wherein the method further comprises: detecting an end of the overheat event responsive to the difference between the temperature measured by the first temperature sensor and the temperature measured by the second temperature sensor being less than a second threshold temperature, the second threshold temperature being lower than the first threshold temperature; and responsive to detecting the end of the overheat event, outputting, via the charging cable, a signal to the power supply requesting that the power supply resume providing power to the mobile computing device.

Example 17

The method of any of examples 10-16, wherein the physical connector is a universal serial bus type-C connector.

Example 18

A mobile computing device comprising: a power storage device; a physical connector configured to receive a charging cable; a plurality of temperature sensors; and a controller configured to: detect, based on a difference between a temperature measured by a first temperature sensor of the plurality of temperature sensors and a function of temperatures measured by a set of temperature sensors of the plurality of temperature sensors, an occurrence of an overheat event in the physical connector, wherein a distance between the first temperature sensor and the physical connector is less than a distance between a particular temperature sensor of the set of temperature sensors and the physical connector; and responsive to detecting the occurrence of the overheat event, reducing an amount of electrical current flowing through the physical connector.

Example 19

The mobile computing device of example 18, wherein, to detect the occurrence of the overheat event, the controller is configured to detect the occurrence of the overheat event responsive to the difference between the temperature measured by the first temperature sensor and the function of the temperatures measured by the set of temperature sensors being greater than a threshold temperature.

Example 20

The mobile computing device of example 18 or example 19, further comprising: a circuit board, wherein the plurality of temperature sensors and the physical connector are attached to the circuit board.

Example 21

The mobile computing device of any of examples 18-20, further comprising: one or more components attached to the circuit board that generate heat during operation.

Example 22 The mobile computing device of example 21, wherein a distance between at least one of the one or more components and the connector is less than the distance between the particular temperature sensor and the physical connector.

Example 23

The mobile computing device of any of examples 18-22, wherein, to reduce the amount of electrical current flowing through the physical connector, the controller is configured to: output, via the charging cable, a signal to a power supply requesting that the power supply reduce an amount of power provided to the mobile computing device.

Example 24

The mobile computing device of example 23, wherein, to output the signal, the controller is configured to: output, via the charging cable, a signal to the power supply requesting that the power supply cease providing power to the mobile computing device.

Example 25

The mobile computing device of any of examples 19-24, wherein the threshold temperature is a first threshold temperature, and wherein the controller is further configured to: detect an end of the overheat event responsive to the difference between the temperature measured by the first temperature sensor and the function of the temperatures measured by the set of temperature sensors being less than a second threshold temperature, the second threshold temperature being lower than the first threshold temperature; and responsive to detecting the end of the overheat event, output, via the charging cable, a signal to the power supply requesting that the power supply resume providing power to the mobile computing device.

Example 26

The mobile computing device of any of examples 18-25, wherein the physical connector is a universal serial bus type-C connector.

Example 27

The mobile computing device of any of examples 18-26, wherein the set of temperature sensors includes only the particular temperature sensor.

Example 28

The mobile computing device of any of examples 18-26, wherein the set of temperature sensors includes two or more temperature sensors.

Example 29

The mobile computing device of example 28, wherein the function of the temperatures measured by the set of temperature sensors comprises an average of temperatures measured by the two or more temperature sensors.

Example 30

The mobile computing device of example 29, wherein the average is an evenly weighted average.

Example 31

The mobile computing device of example 29, wherein the average is an unevenly weighted average.

Example 32

The mobile computing device of example 31, wherein weights used in the unevenly weighted average are based on distances between temperature sensors of the two or more temperature sensors and the physical connector.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A mobile computing device comprising:

a physical connector configured to receive a charging cable;

a plurality of temperature sensors;

a circuit board, wherein the plurality of temperature sensors and the physical connector are attached to the circuit board;

one or more components attached to the circuit board that generate heat during operation; and a controller configured to:

detect, based on a difference between a temperature measured by a first temperature sensor of the plurality of temperature sensors and a temperature measured by a second temperature sensor of the plurality of temperature sensors, an occurrence of an overheat event in the physical connector, wherein a distance between the first temperature sensor and the physical connector is less than a distance between the second temperature sensor and the physical connector, and wherein a distance between at least one of the one or more components and the connector is less than the distance between the second temperature sensor and the physical connector; and responsive to detecting the occurrence of the overheat event, reduce an amount of electrical current flowing through the physical connector.

2. The mobile computing device of claim 1, wherein, to detect the occurrence of the overheat event, the controller is configured to detect the occurrence of the overheat event responsive to the difference between the temperature measured by the first temperature sensor and the temperature measured by the second temperature sensor being greater than a threshold temperature.

3. The mobile computing device of claim 1, wherein, to reduce the amount of electrical current flowing through the physical connector, the controller is configured to:

output, via the charging cable, a signal to a power supply requesting that the power supply reduce an amount of power provided to the mobile computing device.

4. The mobile computing device of claim 3, wherein, to output the signal, the controller is configured to:

output, via the charging cable, a signal to the power supply requesting that the power supply cease providing power to the mobile computing device.

5. The mobile computing device of claim 4, wherein the threshold temperature is a first threshold temperature, and wherein the controller is further configured to:

detect an end of the overheat event responsive to the difference between the temperature measured by the first temperature sensor and the temperature measured by the second temperature sensor being less than a second threshold temperature, the second threshold temperature being lower than the first threshold temperature; and responsive to detecting the end of the overheat event, output, via the charging cable, a signal to the power supply requesting that the power supply resume providing power to the mobile computing device.

6. The mobile computing device of claim 1, wherein the physical connector is a universal serial bus type-C connector.

7. The mobile computing device of claim 1, wherein the second temperature sensor is located at least 3 centimeters from the first temperature sensor.

8. The mobile computing device of claim 1, wherein the one or more components attached to the circuit board that generate heat during operation comprise an application processor or a power management integrated circuit.

9. A method comprising:

receiving electrical power via a physical connector of a mobile computing device, the physical connector attached to a circuit board;

generating, by one or more components of the mobile computing device that are attached to the circuit board, heat;

determining, by a controller of the mobile computing device, a value of a temperature of a virtual temperature sensor, the value representing a difference between a temperature measured by a first temperature sensor of a plurality of temperature sensors of the mobile computing device and a temperature measured by a second temperature sensor of the plurality of temperature sensors, wherein the plurality of temperature sensors are attached to the circuit board, wherein a distance between the first temperature sensor and the physical connector is less than a distance between the second temperature sensor and the physical connector, and wherein a distance between at least one of the one or more components and the connector is less than the distance between the second temperature sensor and the physical connector;

determining, based on the value of the temperature of the virtual temperature sensor, whether an overheat event has occurred; and responsive to determining that the overheat event has occurred, reducing an amount of electrical current flowing through the physical connector.

10. The method of claim 9, wherein determining whether the overheat event has occurred comprises determining that the overheat event has occurred responsive to determining that the difference between the temperature measured by the first temperature sensor and the temperature measured by the second temperature sensor being greater than a threshold temperature.

11. The method of claim 9, wherein reducing the amount of electrical current flowing through the physical connector comprises:

outputting, by the mobile computing device and via a charging cable, a signal to a power supply requesting that the power supply reduce an amount of power provided to the mobile computing device.

12. The method of claim 11, wherein outputting the signal comprises:

outputting, by the mobile computing device and via the charging cable, a signal to the power supply requesting that the power supply cease providing power to the mobile computing device.

13. The method of claim 12, wherein the threshold temperature is a first threshold temperature, and wherein the method further comprises:

detecting an end of the overheat event responsive to the difference between the temperature measured by the first temperature sensor and the temperature measured by the second temperature sensor being less than a second threshold temperature, the second threshold temperature being lower than the first threshold temperature; and responsive to detecting the end of the overheat event, outputting, via the charging cable, a signal to the power supply requesting that the power supply resume providing power to the mobile computing device.

14. The method of claim 9, wherein the physical connector is a universal serial bus type-C connector.

15. The method of claim 9, further comprising:

charging, using the electrical power received via the physical connector, a power storage device of the mobile computing device.

16. A computer-readable storage medium storing instructions that, when executed, cause a controller of a mobile computing device to:

detect, based on a difference between a temperature measured by a first temperature sensor of a plurality of temperature sensors of the mobile computing device and a temperature measured by a second temperature sensor of the plurality of temperature sensors, an occurrence of an overheat event in a physical connector of the mobile computing device, wherein a distance between the first temperature sensor and the physical connector is less than a distance between the second temperature sensor and the physical connector, wherein the plurality of temperature sensors and the physical connector are attached to a circuit board, wherein one or more components that are attached to the circuit board generate heat during operation, and wherein a distance between at least one of the one or more components and the connector is less than the distance between the second temperature sensor and the physical connector; and reduce, responsive to detecting the occurrence of the overheat event, an amount of electrical current flowing through the physical connector.

17. The computer-readable storage medium of claim 16, wherein the instructions that cause the controller to reduce the amount of electrical current comprise instructions that cause the controller to:

output, via a charging cable connected to the physical connector, a signal to a power supply requesting that the power supply reduce an amount of power provided to the mobile computing device.

* * * * *